US012105545B2

(12) United States Patent
Guan et al.

(10) Patent No.: US 12,105,545 B2
(45) Date of Patent: Oct. 1, 2024

(54) INTERNAL POWER GENERATION CIRCUIT

(71) Applicant: Wuxi Chipown Microelectronics Co., Ltd., Jiangsu (CN)

(72) Inventors: Jiawei Guan, Wuxi (CN); Wenting Shi, Wuxi (CN); Haisong Li, Wuxi (CN); Yangbo Yi, Wuxi (CN); Lixin Zhang, Wuxi (CN)

(73) Assignee: Wuxi Chipown Microelectronics Co., Ltd., Jiangsu (CN)

(*) Notice: Subject to any disclaimer, the term of this patent is extended or adjusted under 35 U.S.C. 154(b) by 222 days.

(21) Appl. No.: 17/912,417

(22) PCT Filed: Oct. 30, 2020

(86) PCT No.: PCT/CN2020/125037
§ 371 (c)(1),
(2) Date: Sep. 16, 2022

(87) PCT Pub. No.: WO2022/057026
PCT Pub. Date: Mar. 24, 2022

(65) Prior Publication Data

US 2023/0205241 A1 Jun. 29, 2023

(30) Foreign Application Priority Data

Sep. 15, 2020 (CN) ......................... 202010969609.5

(51) Int. Cl.
*G05F 1/56* (2006.01)

(52) U.S. Cl.
CPC ...................................... *G05F 1/56* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 7,567,069 B2 7/2009 Ryu et al.
7,920,439 B2 * 4/2011 Kumazaki .............. G11C 5/147
365/189.11

(Continued)

FOREIGN PATENT DOCUMENTS

CN 1474410 A 2/2004
CN 101615046 A 12/2009

(Continued)

OTHER PUBLICATIONS

International Search Report (English and Chinese) and Written Opinion of the International Searching Authority (Chinese) issued in PCT/CN2020/125037, mailed Jun. 17, 2021; ISA/CN.

*Primary Examiner* — Jeffrey A Gblende
(74) *Attorney, Agent, or Firm* — Harness, Dickey & Pierce, P.L.C.

(57) ABSTRACT

An internal power generation circuit comprises: a first internal power generation circuit, configured to generate a first power signal based on an external power signal, and including an NMOS transistor, voltage of the first power signal being lower than voltage of the external power signal by threshold voltage of one NMOS transistor, wherein the circuit further includes: a booster unit performing boosting on the first power signal, voltage of a boosted signal being higher than the voltage of the first power signal by at least the threshold voltage of one NMOS transistor; a self-starting feedback circuit configured to generate an output voltage signal based on the boosted signal and the external power signal, wherein before the output voltage signal reaches a target voltage, the output voltage signal follows the external power signal, and after the output voltage signal reaches the target voltage, the output voltage signal holds the target voltage.

15 Claims, 6 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS 8,810,144 B2 8/2014 Hu et al.
9,871,440 B2 * 1/2018 Zhang .............. H03K 19/00315
11,132,013 B2 * 9/2021 Kaiho ...................... G05F 3/247
2004/0027906 A1 2/2004 Itou
2008/0074158 A1 3/2008 Ryu et al.
2013/0293135 A1 11/2013 Hu et al.
2014/0246992 A1 9/2014 Chandupatla et al.
2019/0074820 A1 3/2019 Namai et al.

FOREIGN PATENT DOCUMENTS

CN 102044964 A 5/2011
CN 201917840 U 8/2011
CN 104365004 A 2/2015
CN 105164904 A 12/2015
CN 105607685 A 5/2016
CN 205355773 U 6/2016
CN 107872152 A 4/2018
CN 109461467 A 3/2019
CN 110061544 A 7/2019
CN 210323931 U 4/2020
CN 211089772 U 7/2020
JP 2008-079448 A 4/2008

* cited by examiner

INTERNAL POWER GENERATION CIRCUIT

CROSS-REFERENCE TO RELATED APPLICATIONS

This application is a National Stage of International Application No. PCT/CN2020/125037, filed on Oct. 30, 2020, which claims priority to Chinese Patent Application No. 202010969609.5, filed on Sep. 15, 2020, and entitled "INTERNAL POWER GENERATION CIRCUIT". The entire disclosures of the above applications are expressly incorporated by reference herein.

TECHNICAL FIELD

The present disclosure generally relates to electronic circuit technology field, and more particularly, to an internal power generation circuit.

BACKGROUND

At present, a low-voltage power supply of a chip internal circuit is generally provided by transforming and stabilizing an external power to a target voltage through an internal power generation circuit.

However, an output voltage of the existing internal power generation circuit is relatively low when the external power has a low voltage, causing the internal circuit not to work normally.

Therefore, a new internal power generation circuit is required.

SUMMARY

Embodiments of the present disclosure may mitigate or avoid an N-Metal-Oxide-Semiconductor (NMOS) transistor threshold loss of an output voltage relative to an external power when a chip internal power is generated by using an NMOS transistor.

In an embodiment of the present disclosure, an internal power generation circuit is provided, including: a first internal power generation circuit, configured to generate a first power signal based on an external power signal, and including an NMOS transistor, wherein a voltage of the first power signal is lower than a voltage of the external power signal by at least a threshold voltage of one NMOS transistor, wherein the internal power generation circuit further includes: a booster unit configured to perform boosting on the first power signal to output a boosted signal, wherein a voltage of the boosted signal is higher than the voltage of the first power signal by at least the threshold voltage of one NMOS transistor; a self-starting feedback circuit configured to generate an output voltage signal based on the boosted signal and the external power signal, wherein before the output voltage signal reaches a target voltage, the output voltage signal follows a magnitude of the external power signal, and after the output voltage signal reaches the target voltage, the output voltage signal holds a magnitude of the target voltage.

Optionally, the self-starting feedback circuit includes: a self-starting mirror circuit configured to generate a first turn-on voltage based on the boosted signal, wherein the first turn-on voltage follows a magnitude of the boosted signal before the output voltage signal reaches the target voltage; and a feedback output module configured to generate the output voltage signal, wherein the output voltage signal follows the magnitude of the external power signal before the output voltage signal reaches the target voltage, and the output voltage signal holds the magnitude of the target voltage after the output voltage signal reaches the target voltage.

Optionally, the internal power generation circuit further includes a clamp diode configured to clamp the first turn-on voltage after the first turn-on voltage reaches a clamp voltage of the clamp diode.

Optionally, a maximum value of the target voltage is equal to the clamp voltage of the clamp diode minus the threshold voltage of the NMOS transistor.

Optionally, the self-starting mirror circuit includes: a self-starting branch configured to generate a bias current based on the boosted signal; and a bias branch configured to generate a first turn-on voltage based on the boosted signal and the bias current.

Optionally, the self-starting branch includes a second P-channel Metal Oxide Semiconductor (PMOS) transistor, a first Junction Field Effect Transistor (JFET) transistor and a second resistor, wherein a source of the second PMOS transistor is coupled to an output terminal of the booster unit, a gate and a drain of the second PMOS transistor are coupled to a drain of the first JFET transistor, a gate of the first JFET transistor is grounded, a source of the first JFET transistor is coupled to a first terminal of the second resistor, and a second terminal of the second resistor is grounded.

Optionally, the bias branch includes a first PMOS transistor and a second NMOS transistor, wherein a source of the first PMOS transistor is coupled to the output terminal of the booster unit, a gate of the first PMOS transistor is coupled to the gate of the second PMOS transistor, a drain of the first PMOS transistor is coupled to a drain of the second NMOS transistor, and a gate and a drain of the second NMOS transistor are short-circuited and output the first turn-on voltage.

Optionally, the self-starting mirror circuit includes an N-type JFET with a base grounded.

Optionally, the feedback output module includes: an output module configured to form the output voltage signal; a regulator module, configured to stabilize the output voltage signal after the output voltage signal reaches the target voltage to hold the output voltage signal at the target voltage; and a reference voltage output module, configured to provide a reference voltage.

Optionally, the reference voltage output module includes a first triode, a second triode, a fifth resistor and a sixth resistor, wherein a base of the first triode is coupled to a base of the second triode, and serves as an output terminal of the reference voltage output module to output the reference voltage, an emitter of the first triode is coupled to a first terminal of the fifth resistor and a first terminal of the sixth resistor, an emitter of the second triode is coupled to a second terminal of the fifth resistor, and a second terminal of the sixth resistor is grounded.

Optionally, the output module includes a third NMOS transistor, a second capacitor, a third resistor and a fourth resistor, and the target voltage is associated with the third resistor and the fourth resistor, wherein a drain of the third NMOS transistor is coupled to an external power, a gate of the third NMOS transistor is coupled to the gate of the second NMOS transistor, a source of the third NMOS transistor is an output terminal of the feedback output module to generate the output voltage signal, a first terminal of the third resistor is coupled to the source of the third NMOS transistor, a second terminal of the third resistor is coupled to a first terminal of the fourth resistor and the output terminal of the reference voltage output module, a second terminal of the fourth resistor is grounded, a first terminal of the second capacitor is coupled to the source of the third NMOS transistor, and a second terminal of the second capacitor is grounded.

Optionally, the regulator module includes a fourth PMOS transistor, a fifth PMOS transistor and a third PMOS transistor, wherein a source of the fourth PMOS transistor and a source of the fifth PMOS transistor are coupled to the source of the third NMOS transistor, a gate of the third PMOS transistor and a drain of the fourth PMOS transistor are coupled to a collector of the first triode, a source of the third PMOS transistor is coupled to a source of the second NMOS transistor, and a gate of the fourth PMOS transistor, a gate of the fifth PMOS transistor, and a drain of the fifth PMOS transistor are coupled to a collector of the second triode.

Optionally, the booster unit includes a charge pump circuit which includes a fourth NMOS transistor, a fifth NMOS transistor, a sixth PMOS transistor, a seventh PMOS transistor, a third capacitor, a fourth capacitor, an oscillator and an inverter, wherein a gate of the fourth NMOS transistor, a drain of the fifth NMOS transistor, a drain of the seventh PMOS transistor, and a gate of the sixth PMOS transistor are coupled to a first terminal of the third capacitor, a source of the fourth NMOS transistor, a source of the fifth NMOS transistor, and a first input terminal of the oscillator are coupled to an input terminal of the charge pump circuit, a drain of the fourth NMOS transistor, a gate of the fifth NMOS transistor, a drain of the sixth PMOS transistor, and a gate of the seventh PMOS transistor are coupled to a first terminal of the fourth capacitor, a source of the sixth PMOS transistor and a source of the seventh PMOS transistor are coupled to an output terminal of the charge pump circuit, a second terminal of the third capacitor is coupled to an output terminal of the oscillator and an input terminal of the inverter, and a second terminal of the fourth capacitor is coupled with an output terminal of the inverter.

Optionally, the first internal power generation circuit includes a first resistor, a first NMOS transistor, a first diode and a first capacitor, wherein the external power is coupled to a first terminal of the first resistor and a drain of the first NMOS transistor, a gate of the first NMOS transistor is coupled to a second terminal of the first resistor and a cathode of the first diode, an anode of the first diode and a second terminal of the first capacitor are grounded, and a source of the first NMOS transistor is coupled to a first terminal of the first capacitor, and serves as an output terminal of the internal power generation circuit to output the first power signal.

Optionally, the first diode is a clamp diode, and the first power signal does not exceed a clamp voltage of the first diode minus the threshold voltage of the NMOS transistor.

From above, in the internal power generation circuit provided in the embodiments of the present disclosure, a boosting function of the booster unit is adopted to generate an internal power without a threshold loss, so that internal circuits can work normally even if an external power is at a low voltage.

Further, in the internal power generation circuit provided in the embodiments of the present disclosure, the internal power supplies power to the booster unit, and a boosted signal output by the booster unit serves as a turn-on voltage of a gate of an NMOS transistor, so as to generate an output voltage without a threshold loss. In this manner, mutual supply of internal circuits is achieved without need of an external power.

Further, in the internal power generation circuit provided in the embodiments of the present disclosure, a self-starting feedback circuit is adopted to make the internal power quite stable, and has an output voltage that can be controlled by adjusting device reference values in the self-starting feedback circuit according to practical requirements.

DETAILED DESCRIPTION

Figure 1:
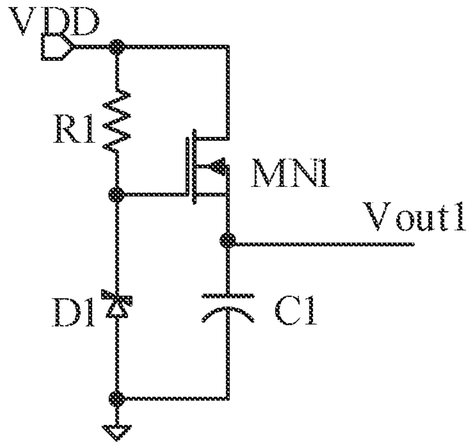
FIG. 1 (Prior art)
FIG. 1 is a structural diagram of an internal power generation circuit in existing techniques.

Existing internal power generation circuits are generally realized by a clamping effect of a diode. As shown in FIG. 1, the internal power generation circuit includes: a first resistor R1, a second resistor R2, a third resistor R3, a first capacitor C1, a first diode D1 and an NMOS transistor MN1, where the first diode D1 is a clamping diode, and a drain of the NMOS transistor MN1 is applied with an external power VDD. A basic working principle of the circuit includes: when the external power VDD is powered on and a turn-on threshold of the NMOS transistor MN1 is reached, the NMOS transistor MN1 is turned on to generate an internal power Vout.

Figure 2:
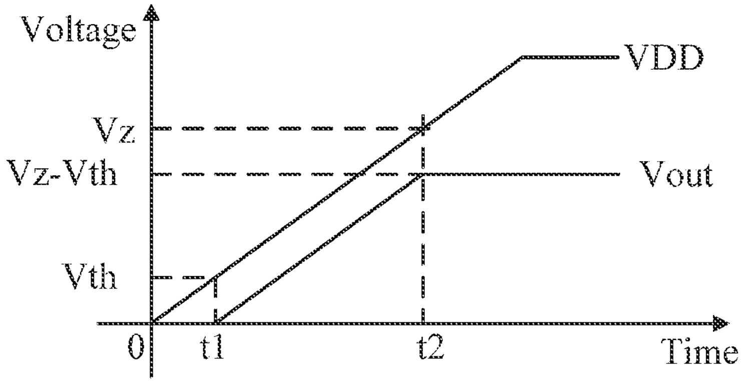
FIG. 2 (Prior art)
FIG. 2 illustrates waves during operation of the internal power generation circuit as shown in FIG. 1.

FIG. 2 illustrates waves during operation of the internal power generation circuit as shown in FIG. 1. It can be seen from FIG. 2 that for the internal power generation circuit in FIG. 1, before the external power VDD reaches a forward conduction voltage of the first diode D1, an output voltage Vout rises with the rise of the external power VDD, but has a threshold loss of one NMOS transistor relative to the external power VDD, that is to say, the output voltage Vout is equal to the external power VDD minus the threshold loss Vth of the NMOS transistor. When the external power VDD reaches the forward conduction voltage of the first diode D1, due to a function of the first diode D1, the output voltage is stabilized at a clamping voltage Vz of the first diode D1 minus the threshold loss Vth of the NMOS transistor. From above, when the voltage of the external power VDD is low, the output voltage Vout is relatively low accordingly, causing the internal circuit not to work normally.

Figure 3:
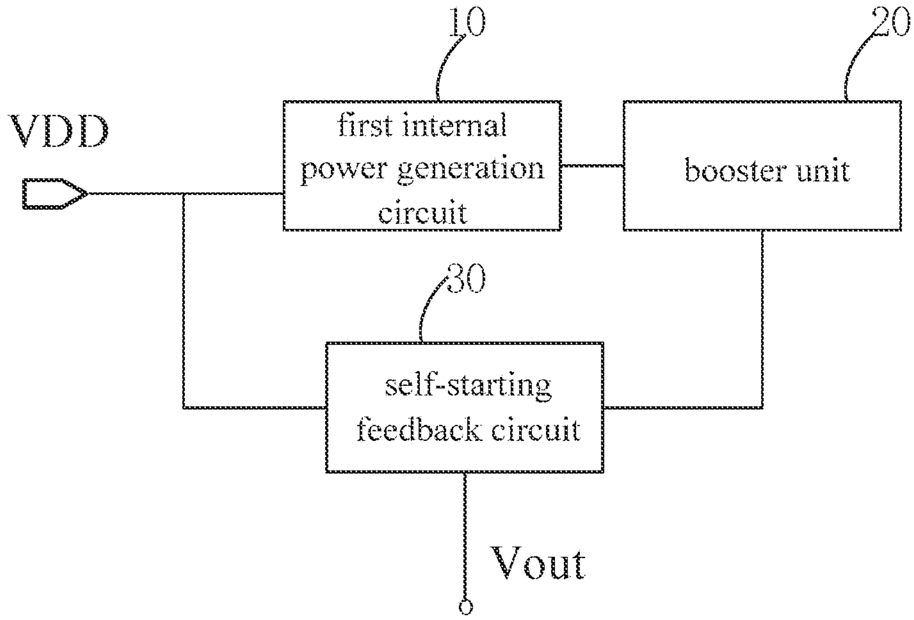
FIG. 3 is a structural diagram of an internal power generation circuit according to an embodiment.

In embodiments of the present disclosure, an internal power generation circuit is provided, as shown in FIG. 3, including: a first internal power generation circuit 10, a booster unit 20 and a self-starting feedback circuit 30.

The first internal power generation circuit 10 is configured to generate a first power signal based on an external power signal VDD, and includes an NMOS transistor, wherein a voltage of the first power signal is lower than a voltage of the external power signal by at least a threshold voltage of one NMOS transistor. The booster unit 20 is configured to perform boosting on the first power signal to output a boosted signal, wherein a voltage of the boosted signal is higher than the voltage of the first power signal by at least the threshold voltage of one NMOS transistor. The self-starting feedback circuit 30 is configured to generate an output voltage signal based on the boosted signal and the external power signal VDD, wherein before the output voltage signal reaches a target voltage, the output voltage signal follows a magnitude of the external power signal VDD, and after the output voltage signal reaches the target voltage, the output voltage signal holds a magnitude of the target voltage.

In some embodiments, the first internal power generation circuit 10 may be the power generation circuit as shown in FIG. 1, where the only difference lies in that the output voltage Vout1 does not directly serve as a power voltage of the internal circuits, but is an input signal of the booster unit 20.

In the above embodiments, the first NMOS transistor MN1 generates the first power signal Vout1, and a gate of MN1 can filter out an overcharged voltage. When the external power VDD starts to be powered on and reaches a turn-on threshold of the first NMOS transistor MN1, MN1 is turned on, and a first power signal Vout1 is generated which rises with the external power VDD and is lower than the external power VDD by a turn-on threshold of one NMOS transistor. When the external power VDD has an overcharge voltage or a burr, the first power signal Vout1 does not change suddenly to protect internal circuits.

Figure 4:
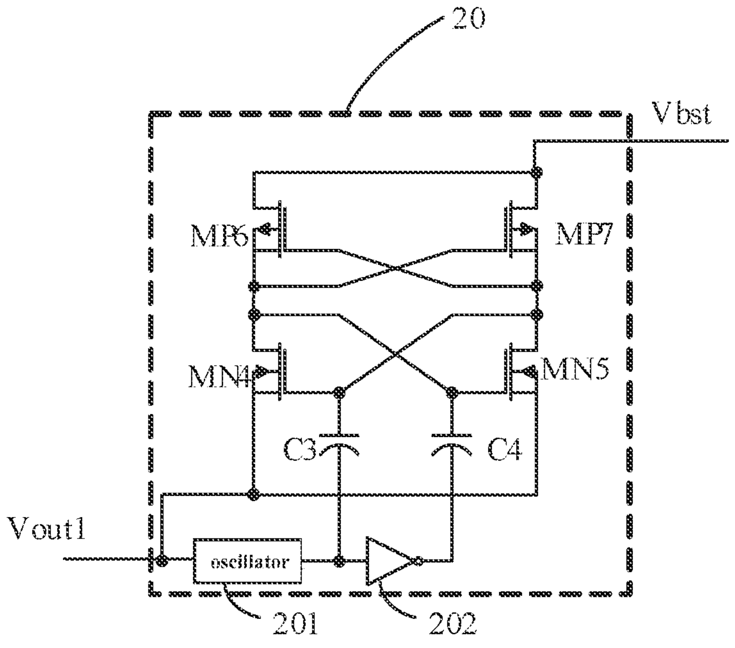
FIG. 4 is a structural diagram of a charge pump circuit according to an embodiment.

The generated first power signal Vout1 is input to the booster unit 20 to be boosted to output the boosted signal. In some embodiments, the booster unit 20 may be a charge pump circuit. FIG. 4 is a structural diagram of a charge pump circuit according to an embodiment. Referring to FIG. 4, the charge pump circuit includes a fourth NMOS transistor MN4, a fifth NMOS transistor MN5, a sixth PMOS transistor MP6, a seventh PMOS transistor MP7, a third capacitor C3, a fourth capacitor C4, an oscillator 201 and an inverter 202. A gate of the fourth NMOS transistor MN4, a drain of the fifth NMOS transistor MN5, a drain of the seventh PMOS transistor MP7, and a gate of the sixth PMOS transistor MP6 are coupled to a first terminal of the third capacitor C3, a source of the fourth NMOS transistor MN4, a source of the fifth NMOS transistor MN5, and a first input terminal of the oscillator 201 are coupled to an input terminal of the charge pump circuit, a drain of the fourth NMOS transistor MN4, a gate of the fifth NMOS transistor MN5, a drain of the sixth PMOS transistor MP6, and a gate of the seventh PMOS transistor MP7 are coupled to a first terminal of the fourth capacitor C4, a source of the sixth PMOS transistor MP6 and a source of the seventh PMOS transistor MP7 are coupled to an output terminal of the charge pump circuit, a second terminal of the third capacitor C3 is coupled to an output terminal of the oscillator 201 and an input terminal of the inverter 202, and a second terminal of the fourth capacitor C4 is coupled with an output terminal of the inverter 202. The input terminal of the charge pump circuit starts to work after receiving the first power signal Vout1 at the input terminal, and the first power signal Vout1 is boosted to generate a boosted signal Vbst at the output terminal of the charge pump circuit. The boosted signal Vbst is higher than the first power signal Vout1 by at least the threshold voltage of one NMOS transistor.

The booster unit 20 outputs the boosted signal to the self-starting feedback circuit 30 so as to process it and obtain the output voltage signal.

Figure 5:
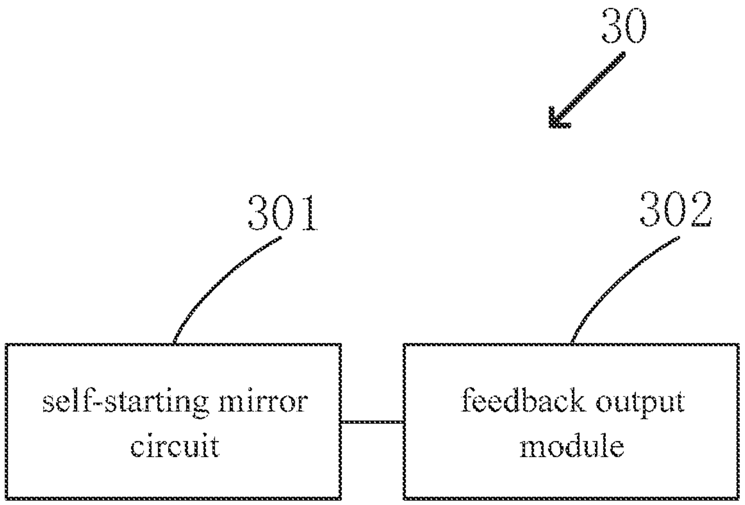
FIG. 5 is a block diagram of a self-starting feedback circuit according to an embodiment.

FIG. 5 is a block diagram of a self-starting feedback circuit 30 according to an embodiment. Referring to FIG. 5, the self-starting feedback circuit 30 includes: a self-starting mirror circuit 301 and a feedback output module 302. The self-starting mirror circuit 301 is configured to generate a first turn-on voltage based on the boosted signal, wherein the first turn-on voltage follows a magnitude of the boosted signal before the output voltage signal reaches the target voltage. The feedback output module 302 is configured to generate the output voltage signal, wherein the output voltage signal follows the magnitude of the external power signal before the output voltage signal reaches the target voltage, and the output voltage signal holds the magnitude of the target voltage after the output voltage signal reaches the target voltage.

Figure 6:
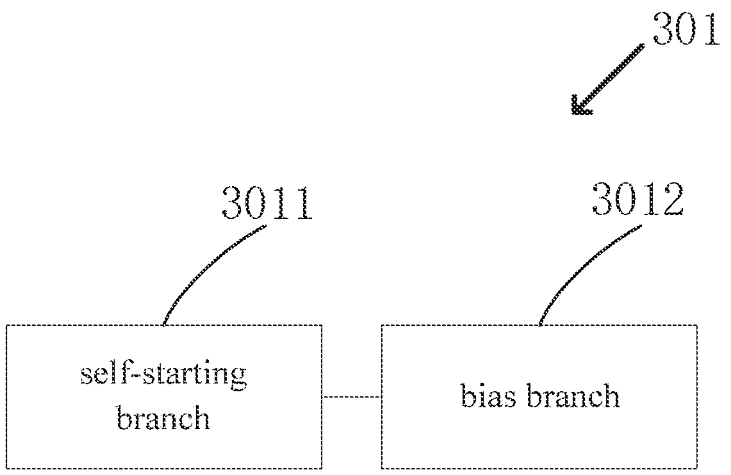
FIG. 6 is a block diagram of a self-starting mirror circuit according to an embodiment.

Referring to FIG. 6, FIG. 6 is a block diagram of a self-starting mirror circuit according to an embodiment, including a self-starting branch 3011 and a bias branch 3012. The self-starting branch 3011 is configured to generate a bias current based on the boosted signal. The self-starting mirror circuit includes an N-type JFET with a base grounded. The bias branch 3012 is configured to generate a first turn-on voltage based on the boosted signal and the bias current.

Figure 7:
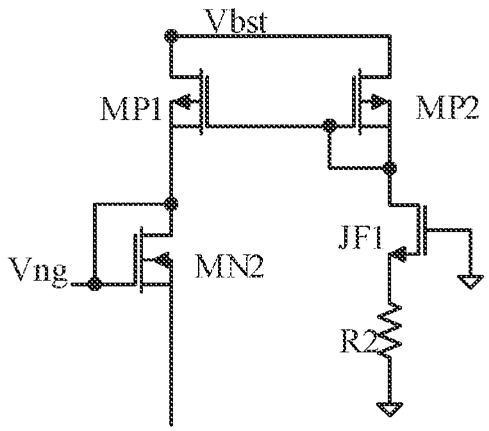
FIG. 7 is a structural diagram of a self-starting mirror circuit according to an embodiment.

Referring to FIG. 7, FIG. 7 is a structural diagram of a self-starting mirror circuit according to an embodiment. The self-starting branch 3011 includes a second PMOS transistor MP2, a first JFET transistor JF1 and a second resistor R2. The bias branch 3012 includes a first PMOS transistor MP1 and a second NMOS transistor MN2. A source of the first PMOS transistor MP1 and a source of the second PMOS transistor MP2 are coupled to an output terminal of the booster unit, i.e., the boosted signal Vbst is provided to the source of the first PMOS transistor MP1 and the source of the second PMOS transistor MP2 to supply power to the self-starting mirror circuit 301. A gate of the first PMOS transistor MP1, and a gate and a drain of the second PMOS transistor MP2 are coupled to a drain of the first JFET transistor JF1. A drain of the first PMOS transistor MP1 is coupled to a drain of the second NMOS transistor MN2, and a gate and a drain of the second NMOS transistor MN2 are short-circuited. A gate of the first JFET transistor JF1 is grounded, a source of the first JFET transistor JF1 is coupled to a first terminal of the second resistor R2, and a second terminal of the second resistor R2 is grounded. From above, the gate of the first JFET transistor JF1 is grounded, and the first JFET transistor JF1 is always in an on state, and has a self-starting function. When the boosted signal Vbst is generated, a current is generated in the second PMOS transistor MP2 and biased into the first PMOS transistor MP1 to generate a first turn-on voltage Vng.

Figure 8:
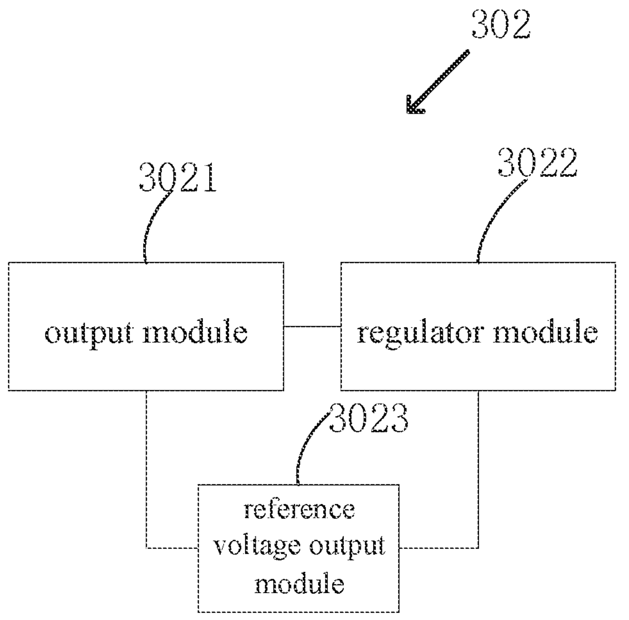
FIG. 8 is a block diagram of a feedback output module according to an embodiment.

Referring to FIG. 8, FIG. 8 is a block diagram of a feedback output module according to an embodiment. The feedback output module 302 includes: an output module 3021, a regulator module 3022 and a reference voltage output module 3023.

Figure 9:
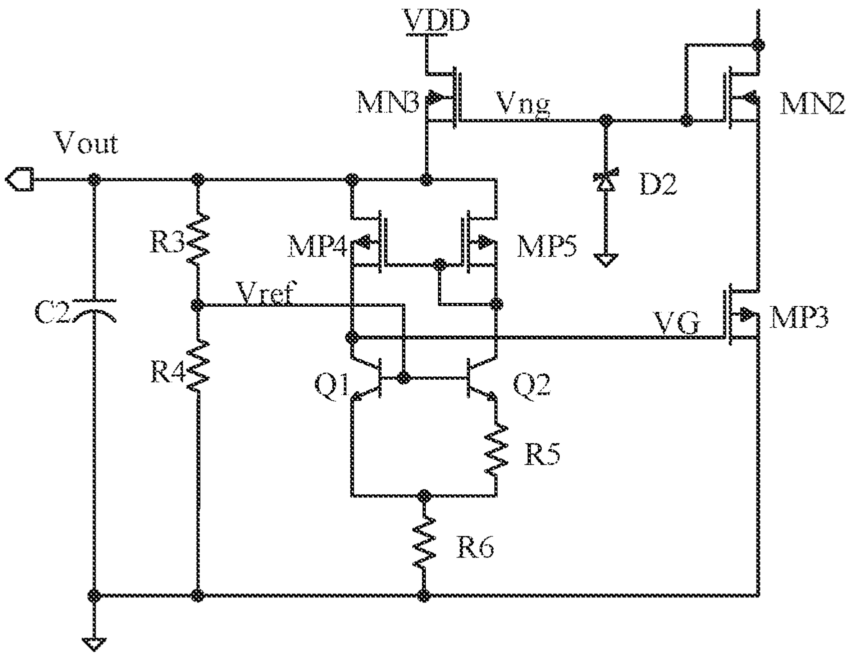
FIG. 9 is a structural diagram of a feedback output module according to an embodiment.

FIG. 9 is a structural diagram of a feedback output module according to an embodiment.

Referring to FIG. 9, the output module 3021 is configured to form the output voltage signal Vout. The output module 3021 includes a third NMOS transistor MN3, a second capacitor C2, a third resistor R3 and a fourth resistor R4, and the target voltage is associated with the third resistor R3 and the fourth resistor R4. A drain of the third NMOS transistor MN3 is coupled to an external power VDD, a gate of the third NMOS transistor MN3 is coupled to the gate of the second NMOS transistor MN2, and a source of the third NMOS transistor MN3 is an output terminal of the feedback output module to generate the output voltage signal Vout. A first terminal of the third resistor R3 is coupled to the source of the third NMOS transistor MN3, and a second terminal of the third resistor R3 is coupled to a first terminal of the fourth resistor R4 and the output terminal of the reference voltage output module 3023. A second terminal of the fourth resistor R4 is grounded. A first terminal of the second capacitor C2 is coupled to the source of the third NMOS transistor MN3, and a second terminal of the second capacitor C2 is grounded.

Referring to FIG. 9, the regulator module 3022 is configured to stabilize the output voltage signal Vout after the output voltage signal reaches the target voltage to hold the output voltage signal Vout at the target voltage. The regulator module 3022 includes a fourth PMOS transistor MP4, a fifth PMOS transistor MP5 and a third PMOS transistor MP3. A source of the fourth PMOS transistor MP4 and a source of the fifth PMOS transistor MP5 are coupled to the source of the third NMOS transistor MN3. A gate of the third PMOS transistor MP3 and a drain of the fourth PMOS transistor MP4 are coupled to a collector of the first triode Q1. A source of the third PMOS transistor MP3 is coupled to a source of the second NMOS transistor MN2. A gate of the fourth PMOS transistor MP4, a gate of the fifth PMOS transistor MP5, and a drain of the fifth PMOS transistor MP5 are coupled to a collector of the second triode Q2.

Referring to FIG. 9, the reference voltage output module 3023 is configured to provide a reference voltage Vref. The reference voltage output module 3023 includes a first triode Q1, a second triode Q2, a fifth resistor R5 and a sixth resistor R6. A base of the first triode Q1 is coupled to a base of the second triode Q2, and serves as an output terminal of the reference voltage output module to output the reference voltage, an emitter of the first triode Q1 is coupled to a first terminal of the fifth resistor R5 and a first terminal of the sixth resistor R6, an emitter of the second triode Q2 is coupled to a second terminal of the fifth resistor R5, and a second terminal of the sixth resistor R6 is grounded. From FIG. 9, when the first triode Q1, the second triode Q2, the fifth resistor R5 and the sixth resistor R6 break a zero balance, the reference voltage Vref is generated, increases with increment of the output voltage signal Vout, and gradually tends to be stable.

From FIG. 9, when the first turn-on voltage Vng reaches a threshold voltage of the third NMOS transistor MN3, the third NMOS transistor MN3 is turned on to generate the output voltage Vout. When the output voltage Vout is generated, the reference voltage Vref and a gate voltage Vg of the third PMOS transistor MP3 are formed. Before the output voltage Vout reaches the target voltage, the output voltage Vout increases with the external power signal VDD, and the reference voltage Vref and the gate voltage Vg increase with the increment of the output voltage Vout. According to characteristics of a bandgap reference circuit, the reference voltage Vref tends to be stable eventually and reaches a stable voltage, and thus the gate voltage Vg of the third PMOS transistor MP3 tends to be stable. As the first turn-on voltage Vng is equal to the gate voltage Vg plus the threshold voltage of the second NMOS transistor and the threshold voltage of the third PMOS transistor, the output voltage Vout is equal to the first turn-on voltage Vng minus the threshold voltage of the third NMOS transistor, and different NMOS transistors have the same threshold voltage, the output voltage Vout is equal to the gate voltage Vg plus the threshold voltage of the third PMOS transistor. Therefore, when the gate voltage Vg tends to be stable, the output voltage Vout tends to be stable as well. After the output voltage Vout reaches the target voltage and tends to be stable, if the output voltage Vout rises due to circuit disturbance or other factors, as Vout=((R3+R4)/R4)*Vref, the reference voltage Vref rises, a voltage difference between the source and drain of the fourth PMOS transistor increases, and the gate voltage Vg decreases. Further, as the output voltage Vout is equal to the gate voltage Vg plus the threshold voltage of the third PMOS transistor, the output voltage Vout decreases and returns to the target Voltage. Conversely, when the output voltage Vout decreases due to circuit disturbance or other factors, the reference voltage Vref decreases. According to the characteristics of the bandgap reference circuit, the reference voltage Vref increases. As Vout=((R3+R4)/R4)*Vref, the output voltage Vout increases and returns to the target voltage.

Further, after the output voltage Vout reaches the target voltage to be output stably, Vout=((R3+R4)/R4)*Vref, the target voltage can be adjusted by adjusting a resistance relation between the third resistor R3 and the fourth resistor R4 so as to meet an internal power requirement of a chip.

In some embodiments, the feedback output module 302 further includes a clamp diode, configured to clamp the first turn-on voltage Vng to a clamp voltage of a clamp diode after the first turn-on voltage Vng reaches the clamp voltage of the clamp diode. Referring to FIG. 9, in some embodiments, the feedback output module 302 includes a second diode D2 that is a clamp diode with a clamp voltage Vz. A cathode of the second diode D2 is coupled to the gate of the third NMOS transistor MN3, and an anode of the second diode D2 is grounded. The output voltage Vout is limited by the clamp voltage Vz of the second diode D2, and a maximum value thereof does not exceed Vz minus the threshold voltage Vth of one NMOS transistor. As shown in FIG. 9, when the first turn-on voltage Vng reaches the threshold voltage of the third NMOS transistor MN3, the third NMOS transistor MN3 is turned on and starts to generate the output voltage Vout. When the output voltage Vout is lower than a difference between the clamp voltage Vz and the threshold voltage Vth of the NMOS transistor, the second diode D2 does not work, and the output voltage Vout increases with the increment of the external power signal VDD. When the output voltage Vout is equal to the difference between the clamp voltage Vz and the threshold voltage Vth of the NMOS transistor, the second diode D2 starts to work, and the output voltage Vout is limited by the clamp voltage Vz of the second diode D2, and no longer increases with the external power signal VDD. In other words, the output voltage Vout cannot exceed the clamp voltage Vz minus the threshold voltage of one NMOS transistor, that is, the target voltage should be set to be lower than or equal to the clamp voltage Vz minus the threshold voltage of one NMOS transistor.

Figure 10:
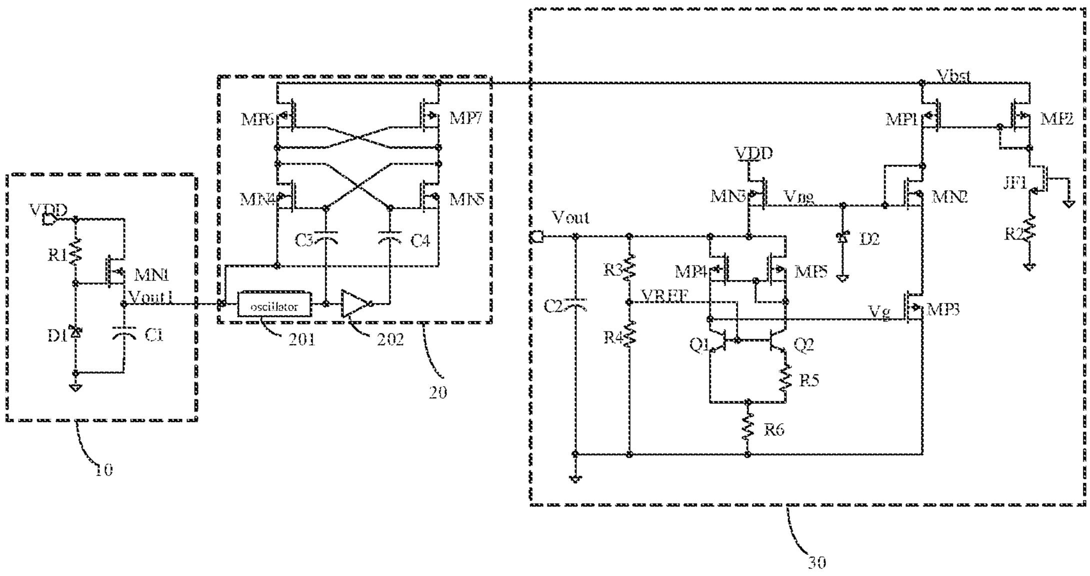
FIG. 10 is a structural diagram of an internal power generation circuit according to an embodiment.
Figure 11:
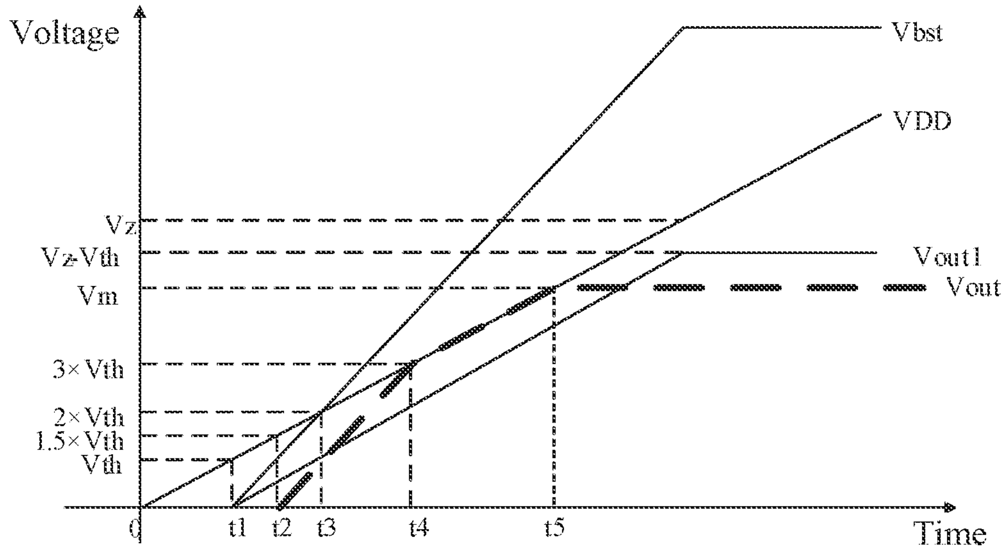
FIG. 11 illustrates waves during operation of the internal power generation circuit as shown in FIG. 10.

FIG. 10 is a structural diagram of an internal power generation circuit according to an embodiment. FIG. 11 illustrates waves during operation of the internal power generation circuit as shown in FIG. 10. In the embodiment, a boosting coefficient of the booster unit 20 is set to be 2, that is, the boosting signal Vbst output by the booster unit 20 is twice the input signal of the booster unit 20, i.e., the first power signal Vout1. Those skilled in the art could understand that, in other embodiments, the boosting coefficient of the booster unit may be set based on practical requirements.

As shown in FIG. 10 and FIG. 11, the external power VDD is applied to the input terminal of the first internal power generation circuit 10. At a time point t1, the external power VDD reaches the threshold voltage Vth of the NMOS transistor, the first NMOS transistor MN1 is turned on, and the first internal power circuit 10 starts to work and generates the first power signal Vout1 which rises with the rise of the external power VDD but is always lower than the external power by the threshold voltage Vth of one NMOS transistor.

The first power signal Vout1 acts on the input terminal of the booster unit 20, and the booster unit 20 starts to work and generates the booster signal Vbst which then acts on the self-starting mirror circuit 301 of the self-starting feedback circuit 30. In the embodiment, a source of the first JFET transistor JF1 is grounded, and JF1 is always in an on state, and has a self-starting function. The drain and the gate of the second NMOS transistor MN2 in the self-starting mirror circuit 301 are short-circuited, and thus, the boosted signal Vbst acting on the source of the first PMOS transistor MP1 is transmitted to the gate of the third NMOS transistor MN3 without a loss to generate the first turn-on voltage Vng that is used to turn on the third NMOS transistor MN3.

At a time point t2, the external power VDD reaches 1.5 times the threshold voltage Vth of the NMOS transistor, and the boosted signal Vbst reaches the threshold voltage of the NMOS transistor, that is, the first turn-on voltage Vng reaches the threshold voltage of the third NMOS transistor MN3, and the third NMOS transistor MN3 is turned on to generate the output voltage Vout which rises with the rise of the boosted signal Vbst but is lower than the boosted signal Vbst by the threshold voltage of one NMOS transistor.

At a time point t3, the external power VDD reaches twice the threshold voltage Vth, the boosted signal Vbst starts to exceed the external power VDD under the action of the booster unit 20, and the output voltage Vout rises with the rise of the boosting signal Vbst. At a time point t4, the output voltage Vout is equal to the external power VDD. Afterward, under the action of the feedback output module 302, the output voltage rises with the rise of the external power VDD.

At a time point t5, the output voltage Vout reaches the target voltage Vm, and the output voltage Vout holds the target voltage Vm to be output stably. Due to the second clamp diode D2, the target voltage Vm does not exceed the difference between the clamp voltage of the second diode D2 and the threshold voltage of the NMOS transistor.

From above, in the internal power generation circuit provided in the embodiments of the present disclosure, the NMOS transistor is adopted to generate the internal power, and a gate of the NMOS transistor can filter out an over-charged voltage. When the external power is at a peak voltage, a source voltage of the NMOS transistor does not change suddenly. Therefore, the internal power generated is relatively stable to ensure internal circuits to work normally.

Further, in the internal power generation circuit provided in the embodiments of the present disclosure, a boosting function of the booster unit is adopted to generate an internal power without a threshold loss, so that internal circuits can work normally even if an external power is at a low voltage. Further, in the internal power generation circuit provided in the embodiments of the present disclosure, the internal power supplies power to the booster unit, and a boosted signal output by the booster unit serves as a turn-on voltage of a gate of an NMOS transistor, so as to generate an output voltage without a threshold loss. In this manner, mutual supply of internal circuits is achieved without need of an external power.

Further, in the internal power generation circuit provided in the embodiments of the present disclosure, a self-starting feedback circuit is adopted to make the internal power quite stable, and has an output voltage that can be controlled by adjusting device reference values in the self-starting feedback circuit according to practical requirements.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An internal power generation circuit for supplying a target voltage to an internal circuit, comprising:

a first internal power generation circuit, configured to generate a first power signal based on an external power signal, and comprising an N-channel Metal Oxide Semiconductor (NMOS) transistor, wherein a voltage of the first power signal is lower than a voltage of the external power signal by at least a threshold voltage of one NMOS transistor, wherein the internal power generation circuit further comprises:

a booster unit configured to perform boosting on the first power signal to output a boosted signal, wherein a voltage of the boosted signal is higher than the voltage of the first power signal by at least the threshold voltage of one NMOS transistor;

a self-starting feedback circuit configured to generate an output voltage signal based on the boosted signal and the external power signal, wherein before the output voltage signal reaches the target voltage, the output voltage signal follows a magnitude of the external power signal, and after the output voltage signal reaches the target voltage, the output voltage signal holds a magnitude of the target voltage.

2. The internal power generation circuit according to claim 1, wherein the self-starting feedback circuit comprises:

a self-starting mirror circuit configured to generate a first turn-on voltage based on the boosted signal, wherein the first turn-on voltage follows a magnitude of the boosted signal before the output voltage signal reaches the target voltage; and a feedback output module configured to generate the output voltage signal, wherein the output voltage signal follows the magnitude of the external power signal before the output voltage signal reaches the target voltage, and the output voltage signal holds the magnitude of the target voltage after the output voltage signal reaches the target voltage.

3. The internal power generation circuit according to claim 2, further comprising a clamp diode configured to clamp the first turn-on voltage after the first turn-on voltage reaches a clamp voltage of the clamp diode.

4. The internal power generation circuit according to claim 3, wherein a maximum value of the target voltage is equal to the clamp voltage of the clamp diode minus the threshold voltage of the NMOS transistor.

5. The internal power generation circuit according to claim 2, wherein the self-starting mirror circuit comprises:

a self-starting branch configured to generate a bias current based on the boosted signal; and a bias branch configured to generate a first turn-on voltage based on the boosted signal and the bias current.

6. The internal power generation circuit according to claim 5, wherein the self-starting branch comprises a second P-channel Metal Oxide Semiconductor (PMOS) transistor, a first Junction Field Effect Transistor (JFET) transistor and a second resistor, wherein a source of the second PMOS transistor is coupled to an output terminal of the booster unit, a gate and a drain of the second PMOS transistor are coupled to a drain of the first JFET transistor, a gate of the first JFET transistor is grounded, a source of the first JFET transistor is coupled to a first terminal of the second resistor, and a second terminal of the second resistor is grounded.

7. The internal power generation circuit according to claim 6, wherein the bias branch comprises a first PMOS transistor and a second NMOS transistor, wherein a source of the first PMOS transistor is coupled to the output terminal of the booster unit, a gate of the first PMOS transistor is coupled to the gate of the second PMOS transistor, a drain of the first PMOS transistor is coupled to a drain of the second NMOS transistor, and a gate and a drain of the second NMOS transistor are short-circuited and output the first turn-on voltage.

8. The internal power generation circuit according to claim 2, wherein the self-starting mirror circuit comprises an N-type JFET with a base grounded.

9. The internal power generation circuit according to claim 7, wherein the feedback output module comprises:

an output module configured to form the output voltage signal;

a regulator module, configured to stabilize the output voltage signal after the output voltage signal reaches the target voltage to hold the output voltage signal at the target voltage; and a reference voltage output module, configured to provide a reference voltage.

10. The internal power generation circuit according to claim 9, wherein the reference voltage output module comprises a first triode, a second triode, a fifth resistor and a sixth resistor, wherein a base of the first triode is coupled to a base of the second triode, and serves as an output terminal of the reference voltage output module to output the reference voltage, an emitter of the first triode is coupled to a first terminal of the fifth resistor and a first terminal of the sixth resistor, an emitter of the second triode is coupled to a second terminal of the fifth resistor, and a second terminal of the sixth resistor is grounded.

11. The internal power generation circuit according to claim 10, wherein the output module comprises a third NMOS transistor, a second capacitor, a third resistor and a fourth resistor, and the target voltage is associated with the third resistor and the fourth resistor, wherein a drain of the third NMOS transistor is coupled to an external power, a gate of the third NMOS transistor is coupled to the gate of the second NMOS transistor, a source of the third NMOS transistor is an output terminal of the feedback output module to generate the output voltage signal, a first terminal of the third resistor is coupled to the source of the third NMOS transistor, a second terminal of the third resistor is coupled to a first terminal of the fourth resistor and the output terminal of the reference voltage output module, a second terminal of the fourth resistor is grounded, a first terminal of the second capacitor is coupled to the source of the third NMOS transistor, and a second terminal of the second capacitor is grounded.

12. The internal power generation circuit according to claim 11, wherein the regulator module comprises a fourth PMOS transistor, a fifth PMOS transistor and a third PMOS transistor, wherein a source of the fourth PMOS transistor and a source of the fifth PMOS transistor are coupled to the source of the third NMOS transistor, a gate of the third PMOS transistor and a drain of the fourth PMOS transistor are coupled to a collector of the first triode, a source of the third PMOS transistor is coupled to a source of the second NMOS transistor, and a gate of the fourth PMOS transistor, a gate of the fifth PMOS transistor, and a drain of the fifth PMOS transistor are coupled to a collector of the second triode.

13. The internal power generation circuit according to claim 1, wherein the booster unit comprises a charge pump circuit which comprises a fourth NMOS transistor, a fifth NMOS transistor, a sixth PMOS transistor, a seventh PMOS transistor, a third capacitor, a fourth capacitor, an oscillator and an inverter, wherein a gate of the fourth NMOS transistor, a drain of the fifth NMOS transistor, a drain of the seventh PMOS transistor, and a gate of the sixth PMOS transistor are coupled to a first terminal of the third capacitor, a source of the fourth NMOS transistor, a source of the fifth NMOS transistor, and a first input terminal of the oscillator are coupled to an input terminal of the charge pump circuit, a drain of the fourth NMOS transistor, a gate of the fifth NMOS transistor, a drain of the sixth PMOS transistor, and a gate of the seventh PMOS transistor are coupled to a first terminal of the fourth capacitor, a source of the sixth PMOS transistor and a source of the seventh PMOS transistor are coupled to an output terminal of the charge pump circuit, a second terminal of the third capacitor is coupled to an output terminal of the oscillator and an input terminal of the inverter, and a second terminal of the fourth capacitor is coupled with an output terminal of the inverter.

14. The internal power generation circuit according to claim 1, wherein the first internal power generation circuit comprises a first resistor, a first NMOS transistor, a first diode and a first capacitor, wherein the external power is coupled to a first terminal of the first resistor and a drain of the first NMOS transistor, a gate of the first NMOS transistor is coupled to a second terminal of the first resistor and a cathode of the first diode, an anode of the first diode and a second terminal of the first capacitor are grounded, and a source of the first NMOS transistor is coupled to a first terminal of the first capacitor, and serves as an output terminal of the internal power generation circuit to output the first power signal.

15. The internal power generation circuit according to claim 14, wherein the first diode is a clamp diode, and the first power signal does not exceed a clamp voltage of the first diode minus the threshold voltage of the NMOS transistor.

* * * * *